INVENTORS
FRANK H. FELLOWS
AND HENRY C. WHEATON
BY Raymond W. Jenkins,
ATTORNEY

INVENTORS
FRANK H. FELLOWS
AND HENRY C. WHEATON
BY
Raymond H Jenkins
ATTORNEY

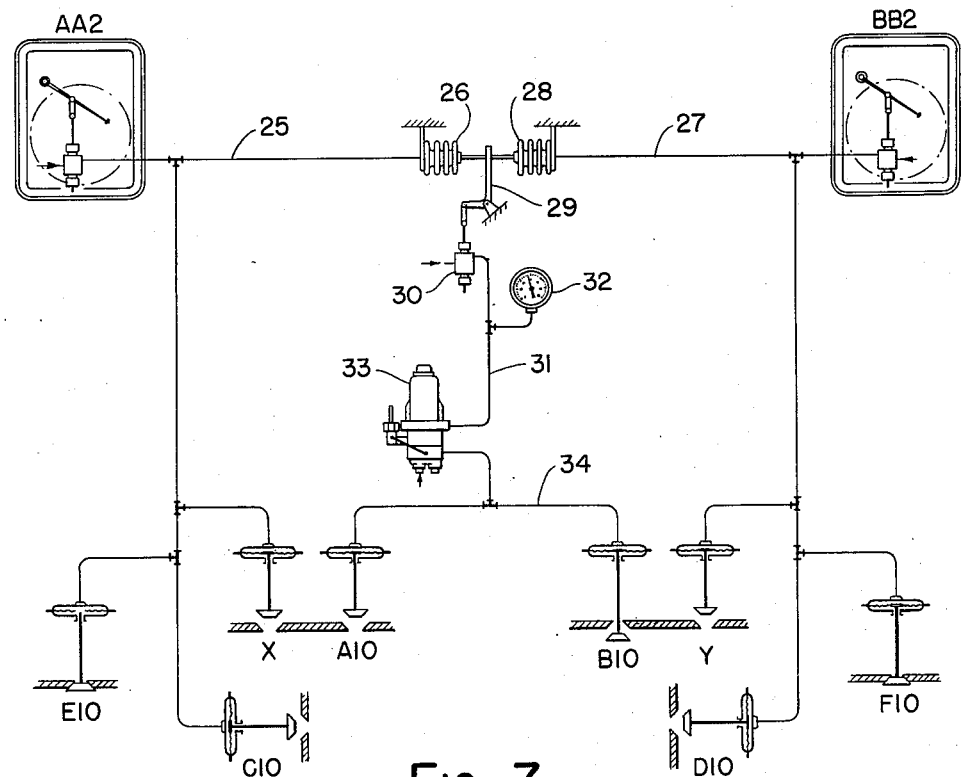
FIG. 7
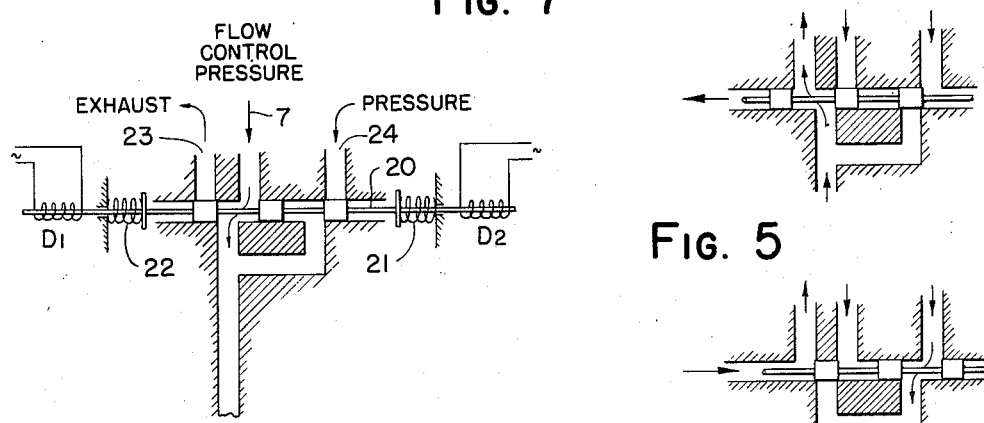
FIG. 5
FIG. 6
FIG. 4
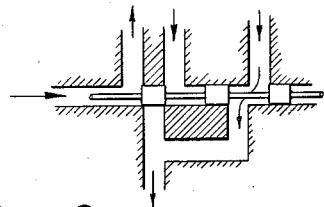
INVENTORS
FRANK H. FELLOWS
AND HENRY C. WHEATON
BY
ATTORNEY Patented Nov. 11, 1952

2,617,439

UNITED STATES PATENT OFFICE 2,617,439

CONTROL SYSTEM

Frank H. Fellows, East Cleveland, Ohio, and Henry C. Wheaton, East Orange, N. J., assignors to Bailey Meter Company, a corporation of Delaware Application December 31, 1946, Serial No. 719,498

14 Claims. (Cl. 137—93)

Our invention relates to control systems and particularly to improved systems for regulating the flow of fluid responsive to, or to satisfy, one or more variable conditions of the fluid being controlled.

The particular example which we will use in the drawing and specification to explain the features of our invention includes a diversion of fluid flow to selected channels for uses as determined by a physical characteristic of the fluid; specifically the concentration of impurities and its conductivity as an index of purity.

One object of our invention is to ascertain a physical characteristic or condition of each of several flowing fluids, to compare them and to utilize the comparison in automatically controlling the fluid.

Another object is to so control a plurality of flowing fluids in accordance with their purity as to selectively supply one or more receivers according to the value of conductivity or to dump impure fluid to waste.

Still another object is to provide either an electrically actuated or a pneumatic control system adapted to selectively divert fluid from a source to one of several channels in dependence upon the value of a physical characteristic or condition of the fluid.

A further object is to control the movement of a material in transit selectively as between different points of usage in accordance with the value of a characteristic or condition of the material.

Other objects will become evident upon a reading of the description of the drawing and of the claims appended hereto.

In the drawings:

Fig. 1 is a diagrammatic showing of a preferred embodiment of our invention including an electrical control system.

Fig. 2 schematically illustrates the electric network of Fig. 1.

Figs. 4, 5 and 6 are diagrammatic views of a valve control in connection with Figs. 1, 2 and 3.

Fig. 7 illustrates the system of Fig. 1 embodied in pneumatic control.

The particular system which we have chosen to illustrate and describe is one wherein a supply, or supplies, of condensate from a vapor utilizing apparatus is controlled in its flow in accordance with the purity of the condensate. The conductivity of the liquid is determined as a measure of its purity, or impurity, and from such a determination, the liquid is selectively channeled to the desired point of usage or to the sewer.

Figure 1:
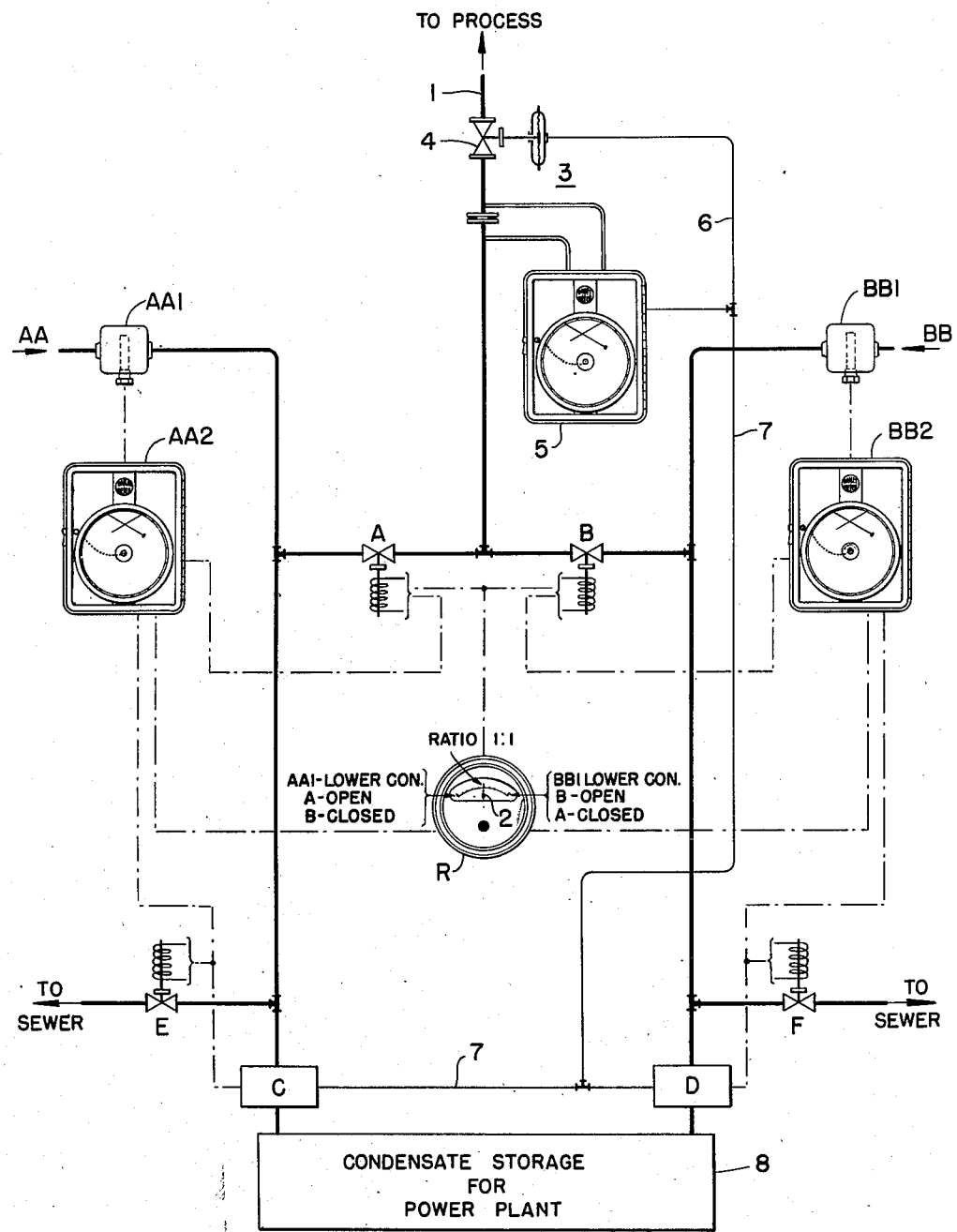

Referring first to Fig. 1 it will be seen that the system is supplied through pipes AA and BB with liquid condensate of varying concentration of impurities (and correspondingly of varying conductivity). A pipe 1 leads to a process desirably supplied with liquid condensate of not less than a predetermined purity. If the condensate becomes too foul for use in the process then it is sent to a storage tank for power plant use. If the condensate becomes even too foul for power plant use it is diverted to waste to the sewer. Desirably we measure the conductivity of the condensate supplied through pipes AA and BB and automatically select the better of the two sources of condensate to be used in supplying the process requirements and we completely shut off both sources from process supply when neither one of the sources is suitable for process use.

The supply pipe AA is equipped with a conductivity cell AA1 actuating a conductivity recorder AA2 including electrical features to be explained hereinafter. The supply pipe BB (in similar manner) is equipped with a conductivity cell BB1 and a conductivity recorder BB2.

We show a ratio meter R connected to the recorders AA2 and BB2 in such a manner that when the ratio of concentration in the two supply lines AA and BB is 1:1 then the pointer 2 of the ratio meter R is at mid-position indicating that the conductivity of the concentrate supplied through AA and BB is the same or in unity ratio (regardless of value). If the concentration of the supply through BB1 is lower than through AA1 then the needle 2 swings clockwise. If the concentration of the supply at AA1 is lower than that of the supply at BB1 then the needle 2 swings counterclockwise. A desired action is that the valves A and B are both open when the needle is in its mid-position indicating that the concentration of the two supplies is the same. The arrangement is such that if supply BB1 has a lower concentration, then valve B is open permitting supply from BB1 to pass to the process through the pipe 1, and valve A is closed thus preventing the more foul or contaminated condensate in the supply AA from being allowed to enter the pipe 1. Conversely if AA1 has a lower concentration, then valve A is open and valve B is closed. Desirably there will be some dead span across the ratio 1:1 or in other words a predictable departure in ratio, in one direction or the other, before either valve A or B is closed.

At 3 we indicate a pneumatically actuated flow control arranged to automatically maintain the rate of condensate supplied to the process through the pipe 1 at a value which is established manually by the operator. This is a known self-contained type of control and forms no particular part of the present invention except as to its interaction upon the other portions of the system. It is only necessary to realize that the control valve 4, located in the pipe 1, is continuously throttled to maintain the rate of flow of fluid through the pipe 1 at a selected value when there is condensate of proper purity available through the supply pipe AA or pipe BB.

In addition to the ratio meter R which is under the domination of the conductivity recorders AA2 and BB2 we provide that the recorders AA2 and BB2 are so connected to the valves A and B as to close either or both in case the concentration of either or both supply exceeds a predetermined value. Furthermore the recorders AA2 and BB2 are equipped with electrical contacts for operating the valves E, C and D, F when the value of concentration of the condensate supply reaches or exceeds certain predetermined values.

In the flow control system 3, the controller 5 continuously establishes an air loading pressure in the pipe 6 for positioning the valve 4. Such air loading pressure is at the same time effective to normally position the valves C and D inversely in general relation to the positioning of the valve 4. We have shown a pipe 7 connecting the pipe 6 with the valves C, D and as will be seen later in the description the normal opening of the valves C and D is in general inversely related to the amount of opening of the valve 4. When very little condensate is passed through the valve 4 to the process a greater amount is necessarily passed through the valves C and D to the condensate storage for the power plant. So long as the condensate supply through the pipes AA and BB is of sufficient purity and only a portion thereof is sent to the process through the pipe 1 it becomes essential that some disposition be made of the remaining liquid. Thus, still assuming that the liquid is of a sufficient purity, the excess is thereupon sent to the power plant storage which is diagrammatically indicated as a tank 8.

Figure 2:
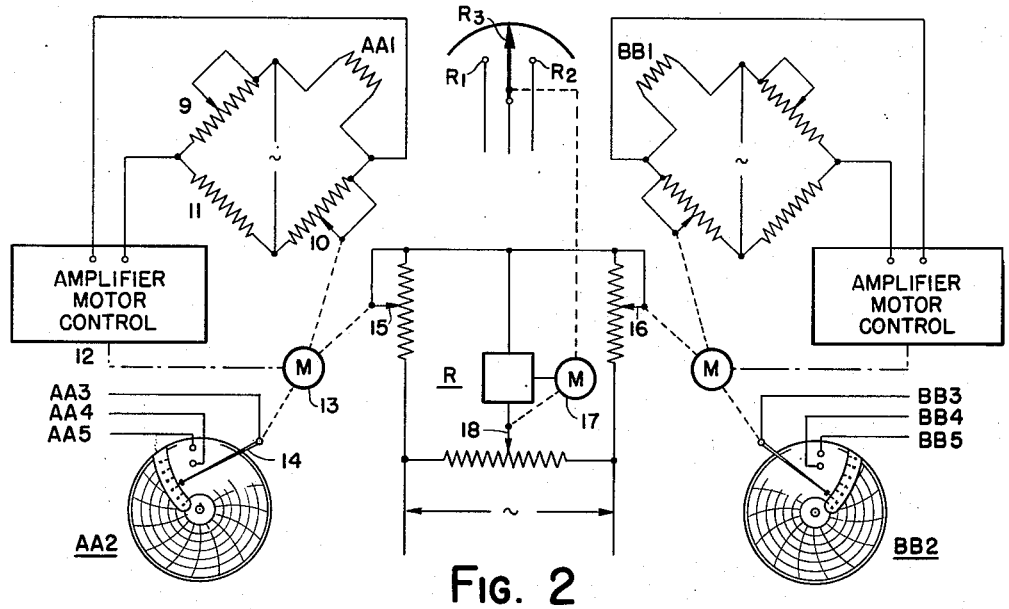

Referring now to Fig. 2 we show therein in schematic fashion the electrical measuring and controlling circuits which we have briefly mentioned in connection with Fig. 1. The conductivity cell AA1 is included as a resistance in one leg of a Wheatstone bridge having a hand adjustment 9, a balancing resistance 10, and a fixed resistance leg 11. The output of the alternating current bridge is effective through an amplifier and motor control circuit 12 to control direction of rotation of a reversible motor 13 which is adapted to simultaneously position the balancing resistance 10, a recording pen 14, and a control resistance 15.

The pen 14 is located in the conductivity recorder AA2 and is positionable relative to a scale and to a revoluble chart. It also has the possibility of successively engaging contacts AA4 and AA5 if the value of concentration increases to predetermined amounts. The operation of the measuring system is such that, upon a variation in concentration of the fluid passing through the pipe AA to which the conductivity cell AA1 is sensitive, the resistance AA1 will vary thus unbalancing the bridge and causing the motor 13 to rotate in proper direction to rebalance the bridge through positioning of the balancing resistor 10. Inasmuch as such movement is representative of the change in concentration or conductivity of the fluid in pipe AA it may be used as an indication or recording of the same and thus the pen arm 14 will indicate or record in terms of conductivity or concentration as desired.

In similar manner the conductivity of the fluid passing through the supply pipe BB is measured upon a recorder BB2 with simultaneous positioning of a control resistance at 16.

The adjustable resistance 15 is preferably located within the casing of the recorder AA2 while the resistance 16 is preferably located within the casing of the recorder BB2. As indicated in Fig. 1 these two resistances are wired to the ratio meter R which is shown in Fig. 2 as a balanceable resistance bridge wherein the resistances 15 and 16 form two arms. Unbalance of the ratio bridge results in a movement of a motor 17 and consequent positioning of the resistance divider 18 until the ratio bridge R is again in balance. At the same time the motor 17 has positioned an indicating contact arm R3 relative to a scale and contacts R1 and R2.

If the concentration of the fluid entering AA is the same as that of the fluid entering BB (regardless of value) then the ratio bridge is in balance with the arm R3 indicating a ratio 1:1 as shown in Figs. 1 and 2. The arrangement is such that if BB1 indicates a lower concentration then the needle R3 moves clockwise while if the concentration AA1 is lower then the needle R3 moves counterclockwise. There is a certain amount of dead space between the contacts R1 and R2 before R3 will engage either one. In other words the ratio must depart a certain amount in one direction or the other from the value of 1:1 before circuit is closed between R3—R2 or R3—R1.

Figure 3:
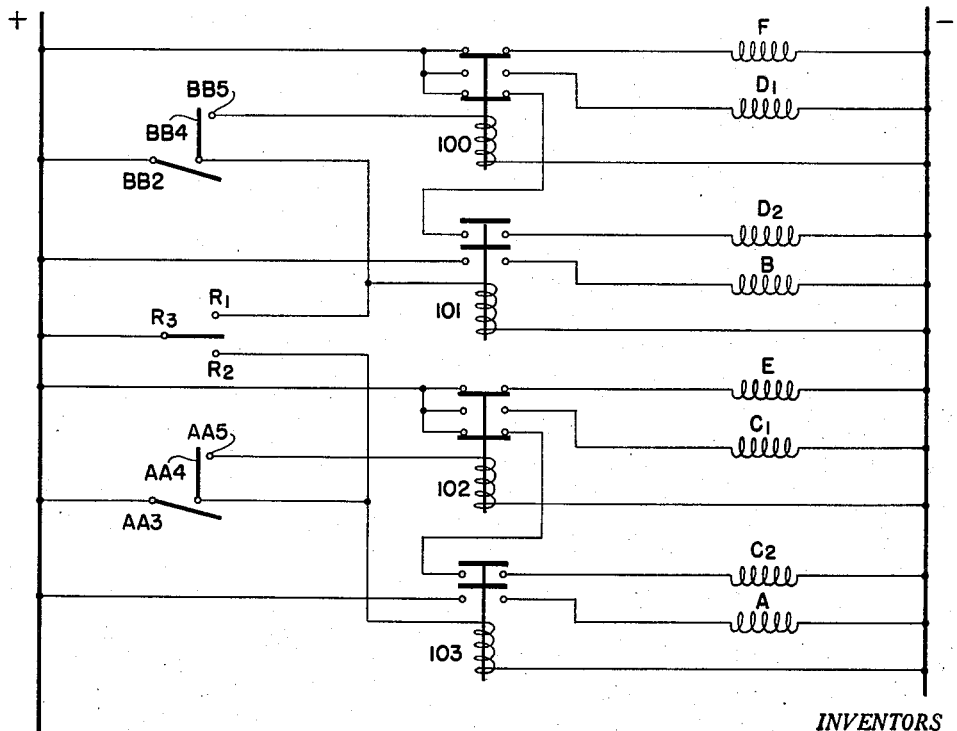
Fig. 3 is an across-the-line wiring diagram of the control circuit of Figs. 1 and 2.

Referring now to Fig. 3 it will be seen that therein we have shown an across-the-line wiring diagram including the contacts R3, R1, R2 of the ratio meter R; the contacts AA3, AA4, AA5 of the recorder AA2; the contacts BB3, BB4, BB5 of the recorder BB2; and the various solenoid devices F, D1, D2, B, E, C1, C2 and A.

While we have indicated, for ease of explanation, that the valves A, B, E and F are solenoid actuated valves it will be understood that these may equally as well be motor operated valves or valves arranged to be remotely actuated in any common power manner through the agency of electric circuit opening or closing. The valves C and D have been illustrated, and will be described, as somewhat special in their operation and control but here again apparatus of various types and arrangements may be utilized without departing from the spirit of our invention.

Referring to Fig. 3 it will be seen that the ratio contactor R3 is arranged, upon departure from unity ratio in one direction to engage the contact R1 for energization of the relay 101 or, upon departure from unity ratio in the other direction to engage the contactor R2 for energization of the relay 103.

The conductivity recorder AA2 is arranged to control the relays 102, 103 while the conductivity recorder BB2 is arranged to control the relays 100, 101. It will be seen that the contact AA4 (and in similar manner the contact BB4) is of some considerable extent in degree motion of the contact arm AA3. The arrangement is such that when the concentration of the fluid entering AA reaches a predetermined high value the contact AA3 engages the contact AA4 and continues in such engagement while the value of concentration continues to increase until at some predetermined higher value the contact AA5 becomes engaged. In the counterclockwise movement of the contact AA3 (Fig. 3) the engagement with contact AA4 energizes relay 103 and maintains it energized until the contact AA5 is engaged whereupon the relay 102 is also energized. The desirability of this operation will be seen as the explanation progresses.

Referring now to Fig. 4, we show therein in schematic fashion the arrangement for controlling the valve D. The valve C of course is controlled in similar manner.

Normally the valves C and D are in a partially open position in amount inversely in proportion to the opening of the valve 4. If both valves A and B are open then the water going to the process through the valve 4 is approximately equal in amount from the supply pipes AA and BB. Inasmuch as only ½ of the amount which is going through the valve 4 may be supplied from pipe BB (for example) then perhaps a considerable proportion of the fluid available through the supply BB must desirably go somewheres other than to the pipe 1 and, so long as the purity of the supply is sufficient, the liquid desirably goes to the condensate storage tank 8 and therefore the valve D must be open to a progressively greater amount as the valve 4 is throttled down.

If the valve B is closed (because the concentration of the supply BB is too high for process use) then it is desired that the valve D be opened wide so that all of the supply BB will go to the storage tank 8. This means that control of the valve D must be removed from the air loading pressure line 7 and put under the control of those contacts of BB2 which dictate that valve B is to be closed off. Such operation is accomplished (Fig. 3) by the contact R3 engaging R1 and energizing relay 101 which causes closure of valve B and also the energization of solenoid D2 which (Fig. 4) changes the normal condition of the controller for valve D to that condition shown in Fig. 6 wherein the valve D is subjected to air under a constant relatively high pressure which holds the valve D in a wide open position so long as relay D2 is energized.

The previous explanation has been in connection with a condition wherein the concentration of the liquid entering at BB exceeds that of the liquid entering at AA but without assigning any particular value to said concentration. If the value of the concentration at BB continues to increase to a value predetermined by the setting of the contact BB4 then such contact will be engaged by the arm BB3 locking in the relay 101. Thus the condition of having valve B closed and valve D held wide open may be attained in either of two operating conditions, namely, first if the concentration at BB is greater than that at AA, regardless of value, and secondly if the concentration at BB attains a predetermined high value.

Assume that the concentration at BB continues to increase. Then it is desired that the valve B be closed, the valve D be closed, and the valve F be opened so that the supply fluid BB is diverted to the sewer. This result is accomplished when the contact BB3 engages the contact BB5 thus additionally energizing the relay 100 while maintaining the relay 101 energized. Energization of relay 100 breaks the circuit to solenoid D2 allowing the spring to center the pilot valve to the position shown in Fig. 4. However, energization of 100 simultaneously causes energization of D1 so that the relay valve assumes the position of Fig. 5 wherein the diaphragm of the valve D is open to the atmosphere and spring pressure closes valve D. Simultaneously energization of the relay 100 opens valve F.

The following operating conditions may exist:

*Values arbitrarily chosen*

1. Concentration AA the same as BB and below value 5.
    Valves A and B open
    Valves E and F closed
    Valves D and C controlled to an opening inversely proportional to the opening of valve 4.
2. Concentration AA higher than BB but below value 5. (R3 engages R2.)
    Valves B and C open
    Valves A, E, F closed
    Valve D controlled with valve 4.
3. Concentration AA higher than BB and at value 5. (R3 engages R2 and AA3 engages AA4.)
    Same as (2).
4. Concentration AA higher than BB and at value 10. (R3 engages R2 and AA3 engages AA4 and AA5.)
    Valves B and E open
    Valves A, C and F closed
    Valve D controlled with valve 4.
5. Concentration AA the same as BB and at value 5. (AA3 engages AA4 and BB3 engages BB4.)
    Valves C and D open
    Valves A, B, E and F closed.

The operational construction of the pilot valve controlling the valve D (or the valve C) is shown diagrammatically in Figs. 4, 5 and 6. Therein, a pilot valve member 20 is normally urged by the springs 21, 22 to a central position (Fig. 4). If the solenoid winding D1 is energized then the pilot stem 20 is urged to the position shown in Fig. 5 against the centering action of the springs 21, 22. Conversely if the solenoid D2 is energized then the pilot stem 20 is urged to the position shown in Fig. 6.

The pilot assembly is connected by the pipe 7 to the fluid pressure established at the flow system 3. The assembly has an opening 23 to the atmosphere and a connection 24 to which is supplied air under normally higher pressure sufficient to completely close the valve D when applied to the valve diaphragm.

As shown in Fig. 4 the spring loaded diaphragm 25 is subjected to the flow control pressure through the pipe 7 and thus the valve D is controlled simultaneously with the positioning of the valve 4. Preferably the valve 4 and the valve D are of opposite construction whereby the valve D tends to open as loading pressure increases while the valve 4 tends to open as loading pressure decreases.

In the arrangement of Fig. 4 the pressure of pipe 7 is effective upon the diaphragm 25 while the exhaust outlet 23 is closed from the diaphragm and the relatively higher pressure connection 24 is also closed from the diaphragm.

In Fig. 5 it is assumed that the solenoid D1 is energized and the assembly 20 is moved to its left-hand position of travel. Under this condition the normal control pressure of pipe 7 is not available upon diaphragm 25 nor is the normally higher pressure of pipe 24. The diaphragm casing is evacuated to the atmosphere through the exhaust port 23 and the spring action of the valve D closes the valve.

In Fig. 6 the alternate control position effected by energization of solenoid D2 is shown wherein the diaphragm 25 is closed off from the normal control pressure of pipe 7 as well as from the exhaust port 23. It is opened, however, to allow application to the diaphragm for normally higher pressure available at port 24 and which pressure is preferably great enough to open the valve D to its maximum opening.

Thus in general Fig. 4 illustrates a condition wherein the valve D is under inverse throttling with respect to valve 4. Fig. 5 illustrates valve D tightly closed while Fig. 6 illustrates valve D in a condition of full opening.

In Fig. 7 we illustrate our invention embodied in a pneumatic control system to perform, by other measuring and controlling instrumentalities, functions similar to those described in connection with Fig. 1.

The conductivity recorder-controller AA2 (and similarly BB2) is provided with a pneumatic pilot valve which may be of the general type described and claimed in the patent to Johnson 2,054,464 and is arranged to continuously establish a fluid loading pressure representative of the conductivity of the fluid passing through the pipe AA. Such loading pressure may be in the order of 5 to 30 p. s. i. air pressure and is available through a pipe 25A upon the interior of an expansible-contractible chamber such as the bellows 26 having a movable end. In similar fashion the conductivity recorder-controller BB2 continuously establishes an air loading pressure effective through a pipe 27 upon the interior of bellows 28. The movable ends of the bellows 26, 28 are joined by a linkage 29 adapted to position the movable element of a pilot valve 30. The elements 26, 28, 29, 30 provide a ratio meter continuously establishing a pneumatic loading pressure in a pipe 31 representative of ratio between the pressures within the bellows 26 and 28 and thereby to determine the interrelation of conductivity of the fluids passing through the pipes AA and BB.

Connected to the pipe 31 is a ratio pressure indicator 32 so graduated that when the pressure within the pipe 31 is for example 15 p. s. i. and the ratio meter is balanced at unity ratio then the needle of the indicator 32 is in its central position indicating a ratio of 1:1 of conductivities. If the pneumatic loading pressure within the pipe 31 decreases from 15 p. s. i. then the needle of the gage 32 moves in one direction while if the pressure within the pipe 31 increases above 15 p. s. i. the needle moves in the other direction. Thus (for example) if the ratio of concentrations is unity a predetermined pressure exists within the pipe 31 whereas departure from such unity relationship causes said loading pressure to depart in one direction or the other from a predetermined value.

The loading pressure effective within the pipe 31 is available through a standardizing relay 33 to a pipe 34 joining the diaphragm actuators of valves A10 and B10 which control the inflow of condensate from the pipe AA and the pipe BB respectively to the process supply pipe 1.

We have shown the valves A10 and B10 to be of a generally operative type wherein with a loading pressure effective within the pipe 34 at say 15 p. s. i. both valves A10 and B10 are open. If the loading pressure decreases then the valve A10 remains open but the valve B10 starts to close. Conversely if the loading pressure goes above 15 p. s. i. then the valve B10 remains in its wide open position while the valve A10 is caused to go in a closing direction. Thus the general operation is similar to that which we have described in connection with Fig. 1 except that herein the operation is through pneumatic control means rather than through electrical control means.

In the present embodiment we have indicated a second valve X adjacent the valve A10 and in series therewith. Likewise we indicate a valve Y adjacent and in series to the valve B10. Normally the valves X and Y are open. However, as pressure within the pipe 25A (or the pipe 27) increases above a predetermined value, representative of concentration increasing above a predetermined value, the valve X (or the valve Y) will close off. In similar fashion the valve E10 is adapted to open when a predetermined high loading pressure is reached while the valve C10 is adapted to close upon the attainment of the predetermined high loading pressure. The pressures at which the valves X, E10 and C10 are actuated may be predetermined by adjustment of the spring loading of the individual valves and thus the sequence operation of the valves may be carried out in a manner similar to that explained in connection with the solenoid actuated valves of Figs. 1 to 6 inclusive.

By providing the valves X and Y respectively in series with the valves A10 and B10 we allow for the shutting off of connection to the outlet pipe 1, upon attainment of predetermined high concentration, without interfering with the positioning of the valves A10 and B10.

In general the normal control, and emergency sequential functioning, of the valves of Fig. 7 is as previously described in connection with the electrical control systems. The particular apparatus, and mode of operation thereof, is of course distinctive to the pneumatic control mechanism as compared to solenoid actuated electrical mechanisms.

While we have chosen to illustrate and describe two preferred embodiments of our invention it is to be understood that this is by way of example only and is not to be considered as limiting.

What we claim as new, and desire to secure by Letters Patent of the United States is:

1. A control system comprising, in combination, a plurality of conduits, each supplying a fluid having a variable chemical composition, a conduit connected to said plurality of conduits for supplying fluid to a point of use, individual valve means for controlling the flow of fluid from said plurality of conduits to said connected conduit, and comparing means continually responsive to the chemical composition of the fluid in each of said plurality of conduits for selectively controlling said valve means in accordance with the comparison to open the valve means from the supply conduit with fluid of better composition and to close the valve means from the other supply conduit when an unequality of composition occurs.

2. A control system comprising, in combination, a plurality of conduits, each supplying a fluid which varies in purity, a conduit connected to said plurality of conduits for supplying fluid to a point of use, individual valve means for controlling the flow of fluid from each of said plurality of conduits to said connected conduit, and comparing means continually responsive to the conductivity of the fluid in each of said plurality of conduits as a measure of its purity for selectively controlling said valve means in accordance with the comparison to open the valve means from the supply conduit of greater purity and to close the valve means from the other supply conduit when an unequality of purity occurs.

3. A control system comprising, in combination, a plurality of conduits, each supplying a fluid having a variable operating characteristic, a conduit connected to said plurality of conduits for supplying fluid to a point of use, individual solenoid operated on-off valve means for controlling the flow of fluid from each of said plurality of conduits to said connected conduit, and comparing means continually responsive to the characteristic of the fluid in each of said plurality of conduits for selectively controlling the energizing of said solenoids in accordance with the comparison to open the valve means from the supply conduit of better characteristic and to close the valve means from the other conduit when an unequality of characteristics occurs.

4. A control system comprising, in combination, a plurality of conduits, each supplying a fluid having a variable chemical composition, a conduit connected to said plurality of conduits for supplying fluid to a point of use, individual pressure actuated valve means for controlling of fluid from each of said plurality of conduits to said connected conduit, and comparing means continually responsive to the chemical composition of the fluid in each of said plurality of conduits for selectively controlling the supply of pressure to said pressure actuated valve means to open the valve means from the supply conduit of better composition and to close the valve means from the other supply conduit when an unequality of compositions occurs.

5. A control system comprising, in combination, a plurality of conduits, each supplying a fluid having a variable operating characteristic, a conduit adapted to be connected to said plurality of conduits for supplying fluid to a point of use, groups of branch conduits communicating with each of said supply conduits, one of each group connected to the use conduit and the other connected to a receiver, valve means in each of said branch conduits for controlling the flow of fluid therethrough, and comparing means continually responsive to the operating characteristic of the fluid in each of said plurality of supply conduits for controlling the valve means in the branch conduits connected thereto, said characteristic responsive means operating at a predetermined value of the characteristic for selectively operating the branch conduits of each supply conduit to close the valve means in the branch conduit connected to the use conduit and to open the valve means in the branch conduit connected to said receiver, and vice versa.

6. A control system comprising, in combination, a plurality of conduits, each supplying a fluid having a variable operating characteristic, a conduit adapted to be connected to said plurality of conduits for supplying fluid to a point of use, groups of branch conduits communicating with each of said supply conduits, one of each group connected to the use conduit, another connected to a receiver and a third connected to waste, valve means in each of said branch conduits for controlling the flow of fluid therethrough, and means responsive to the operating characteristic of the fluid in each of said plurality of conduits for controlling the valve means in the branch conduits connected thereto, said last mentioned means operating on an increase in the characteristic to a predetermined value for closing the valve means in the branch connected to the use conduit and opening the valve means in the branch connected to the receiver, and maintaining the valve means in the branch connected to waste closed, and operating on an increase in the characteristic to a higher predetermined value for holding the valve means in the branch connected to the use conduit closed, effecting closure of the valve means in the branch connected to the receiver, and opening the valve means in the branch connected to waste.

7. A control system including in combination, a plurality of conduits each supplying a fluid, the several fluids having a variable purity, means related to the individual supply conduits sensitive to the purity of the fluid in the conduit, means controlled by said sensitive means for continually comparing the purity of the supply fluids, and means associated with the supply conduits positioned by said comparing means and adapted to divert the supply fluid to one or another of a plurality of usage locations in accordance with the comparative purities of the several supply streams.

8. The combination of claim 7 wherein the said camparing means is a ratio determining device continually indicating the correspondence of purity of the supply fluids or the departure from correspondence and the direction of such departure.

9. A control system including in combination, a pair of conduits each supplying a fluid which may be of varying purity, means associated with each of the conduits sensitive to the purity of the fluid therein, means controlled by said sensitive means for continually comparing the purities of the fluids, a plurality of locations to which the fluids may be diverted, valve means interconnecting the supply conduits with the locations, and means under the control of the comparing means arranged to actuate the valve means for selecting the location to which each supply fluid is diverted according to the comparison of purity of the supply streams.

10. A control system including, in combination, a pair of conduits, each supplying a fluid which may be of varying purity, means associated with each of the conduits sensitive to the purity of the fluid therein, means controlled by said sensitive means for continually comparing the purities of the fluids, means for delivering fluid from said supply conduits to a plurality of locations for use, means for delivering fluid from said supply conduits to waste, valve means for controlling the flow of fluid from said supply conduits to said locations and to waste, means under the control of said comparing means for actuating said valve means to select the supply conduit from which fluid is supplied to said locations, and means associated with said sensitive means for imposing a selective control on said valve means to discharge the fluid in any supply conduit to waste when the purity of the fluid in such conduit is less than a predetermined value.

11. A control system comprising, in combination, a plurality of conduits, each supplying a fluid having a variable operating characteristic, a conduit connected to said plurality of conduits for supplying fluid to a point of use, valve means for controlling the flow of fluid from said plurality of conduits to said connected conduit, a branch conduit connected to each of said plurality of conduits for delivering fluid from each of said plurality of conduits to a second point, valve means for controlling the flow of fluid through said branch conduit, valve means for controlling the flow of fluid through said connected conduit, means responsive to the rate of fluid flow through said connected conduit for positioning the valve means in such conduit and in said branch conduit inversely relative to each other, means sensitive to the operating characteristic of the fluid in each of said supply connections, means controlled by said sensitive means for comparing the characteristic of the fluids, and means associated with said comparing means for positioning said first and second mentioned valve means, said last mentioned means operating on a predetermined difference in said fluid characteristics for controlling said first mentioned valve means to determine which section of the plurality of conduits will supply the connected conduit.

12. The system of claim 11 including a second branch conduit leading to waste from each supply conduit, valve means for controlling the flow of fluid through said second branch conduits, and means associated with the sensitive means of each supply conduit for regulating the valve means in said first and second branch conduits, said last mentioned means operating on a change in the fluid characteristic to a predetermined value for closing the valve means in the first mentioned branch conduit and opening the valve means in said second branch conduit.

13. A control system comprising, in combination, a plurality of conduits, each supplying a fluid varying in purity, branch conduits communicating with each of said supply conduits with one branch conduit from each supply conduit leading to a common point from which fluid may be used, individual valve means for controlling the flow of fluid through each of said branch conduits leading to a common point, means for measuring the purity of fluid in each of said supply conduits, means continually comparing the measurements of purity, and means positioned by said comparing means for controlling said valve means, said positioned means operating upon an equality in said measurements to maintain the valve means controlling the flow of fluid through the branch conduits open and on a predetermined difference in said measurements to close one of said valve means and open the other of said valve means.

14. The combination of claim 13 wherein said comparing means operates on a predetermined difference in the purity measurements to close the valve means in the branch conduit in which the fluid is less pure.

FRANK H. FELLOWS.
HENRY C. WHEATON.

REFERENCES CITED

The following references are of record in the file of this patent:

UNITED STATES PATENTS

| Number | Name | Date |
|---|---|---|
| 1,944,243 | Kegl | Jan. 23, 1934 |
| 1,953,491 | Sainte-Martine | Apr. 3, 1934 |
| 1,987,032 | Spence | Jan. 8, 1935 |
| 2,005,266 | Ray | June 18, 1935 |
| 2,197,118 | Astle | Apr. 16, 1940 |
| 2,200,578 | Mahon | May 14, 1940 |
| 2,218,861 | Stumpf | Oct. 22, 1940 |
| 2,236,087 | Detwilder | Mar. 25, 1941 |
| 2,314,152 | Mallory | Mar. 16, 1943 |
| 2,376,694 | Hewlett | May 22, 1945 |